UNITED STATES PATENT OFFICE.

JOHN OLSON, OF WEST CHICAGO, ILLINOIS.

HARVESTER.

1,322,334.   Specification of Letters Patent.   Patented Nov. 18, 1919.

Application filed February 21, 1917. Serial No. 150,036.

*To all whom it may concern:*

Be it known that I, JOHN OLSON, a citizen of the United States, residing at West Chicago, in the county of Dupage and State of Illinois, have invented certain new and useful Improvements in Harvesters, of which the following is a specification.

This invention relates to improvements in binders. One object is to produce a binder having a reel and sickle that may be manually raised from operative to inoperative position to facilitate passage of the machine through a gate, as from one field to another. A further object is to provide a binder having rear truck wheels which may be raised or lowered by a worm gear. A further object is to provide means for locking the reel and sickle in raised or inoperative position, when desired, to avoid accident to the machine incident to the jar, jolt or vibration caused by its travel over uneven ground. A further object is to provide a machine that is simple in construction, efficient in operation and comparatively cheap to manufacture.

With the foregoing and other objects in view the invention consists in the combination and arrangement of parts to be hereinafter fully described, pointed out in the appended claims and illustrated in the accompanying drawings which form a part of this specification and in which—

Like reference characters denote corresponding parts in both views.

Figure 1:
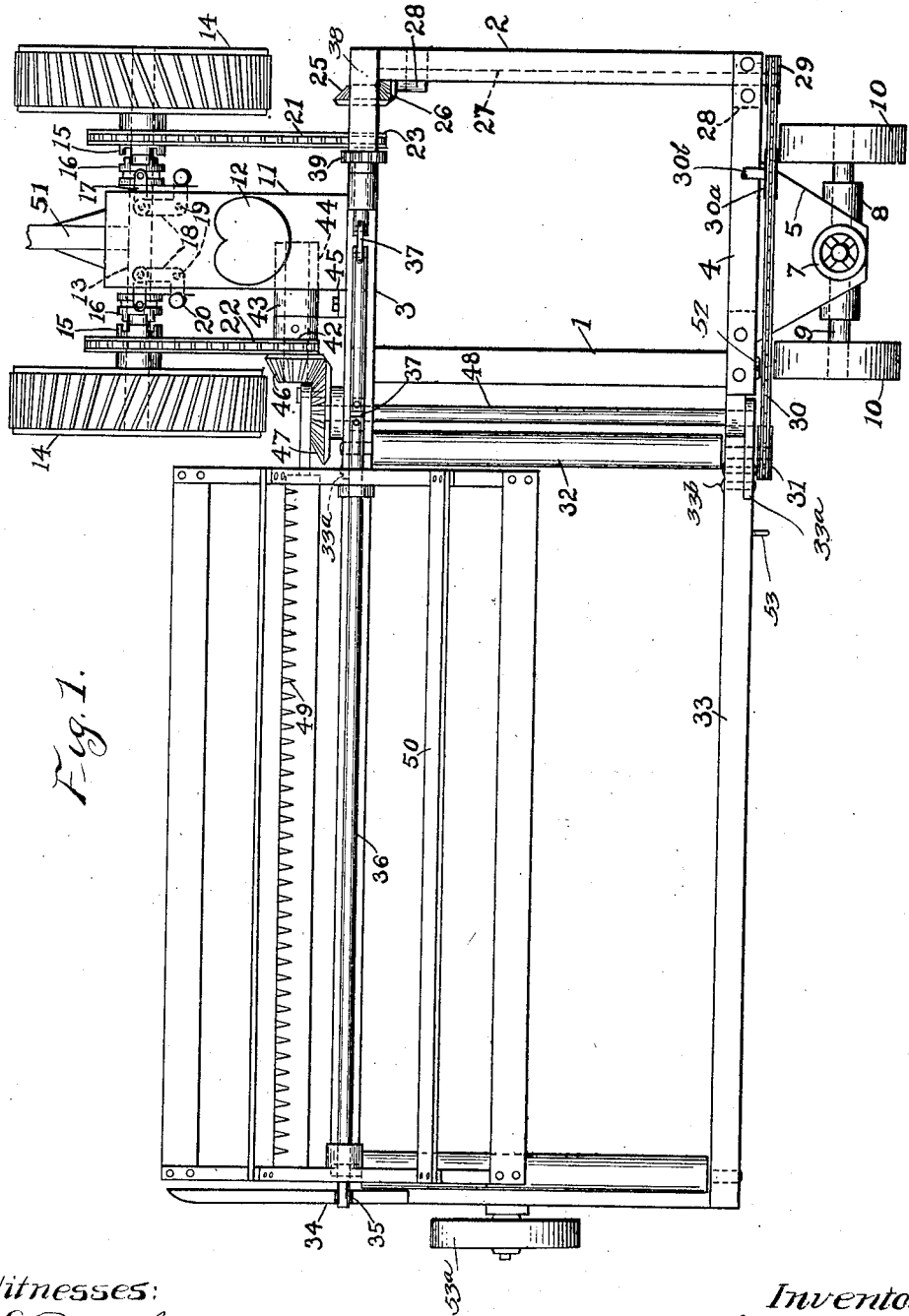
Figure 1 is a top plan view of my improved binder, the conveyer canvas being eliminated for the sake of clearness.

The frame of my machine comprises side beams 1, 2 and end beams 3, 4, the beam 4 carrying a projection 5 through which a worm shaft 6, provided with hand wheel 7, extends that is connected to the bearing 8 arranged upon the rear axle 9 provided with the rear wheels 10. The frame at its front end carries a platform 11 provided with a seat 12 and with suitable bearings for the front axle 13 to which the front drive wheels 14 are made fast. Clutch members 15 loose upon the axle 13 are adapted to engage with the clutch members 16 slidably keyed to the axle, said last named clutch members being controlled by links 17 connected to the bell-cranks 18 fulcrumed upon pivots 19 carried by said platform, the said bell cranks being provided with levers 20. Each clutch member 15 is provided with suitable cogs engaged by the chains 21, 22, the chain 21 engaging with a cog 23 of a transverse stub shaft 24 journaled in suitable bearings arranged directly beneath the frame beam 3 and suspended from said beam. A bevel gear 25 terminally carried by the shaft 24 is in mesh with another bevel gear 26 of longitudinal shaft 27 which shaft is journaled in bearings 28 depending from the main frame and said shaft 27 carries a terminal gear 29 connected by chain 30 with a terminal gear 31 of the canvas-carrying roller 32, said roller having its ends journaled in one end of the sickle frame 33 which frame is pivotally connected to the main frame by link 33$^a$ which pivots upon the shaft 48 and is made fast to frame 33 by bolts 33$^b$. Chain 30 passes also over a gear 30$^a$ of stub shaft 30$^b$ carried by the frame.

The said sickle frame 33 carries a standard 34 which is bifurcated as indicated at 35 at its upper end to normally form a bearing for one end of the reel shaft 36 which is a sectional shaft, the sections thereof being connected by universal couplings 37 and one end of said shaft being journaled in a standard 38 carried by the front frame beam 3. The reel shaft at its inner end is provided with a gear 39 connected by chain 40 to another gear 41 of the said stub shaft 24.

Referring again to the said chain 22 the same engages with a gear 42 of a stub shaft 43 journaled in bearings 44 supported by straps 45 depending from the main frame and said stub shaft 43 terminally carries a bevel gear 46 in mesh with a bevel gear 47 of transmission shaft 48 journaled in the said sickle frame, said bevel gear 47, further, operating to drive the sickle 49. The reel shaft 36 aforesaid carries the reel 50 which operates to depress the standing grain into engagement with the sickle 49.

Figure 2:
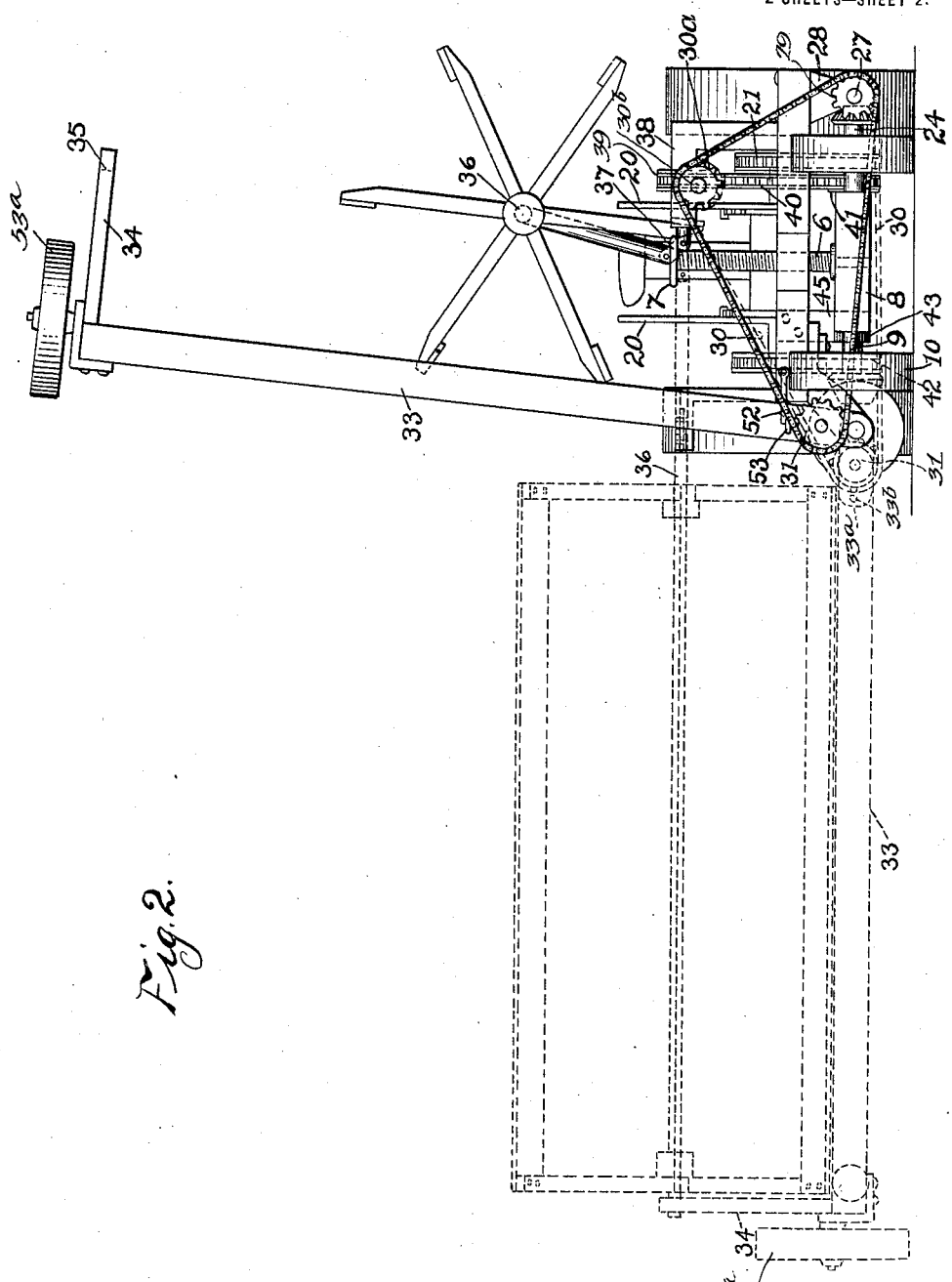
Fig. 2 is an end elevation of the binder with the reel and sickle shown in raised or inoperative position in full lines, and in operative position in dotted lines.

In operation the machine is drawn by the tongue 51 and the sickle 49 is operated by throwing one clutch member 16 into engagement with its coöperating member 15 to drive chain 22 thus driving the bevel gears 46, 47 and operating the sickle. To drive the grain-carrying canvas and operate the reel the other clutch 15, 16 is thrown into operation thus, through the medium of chains 21, 40 driving the reel shaft and driving bevel gears 25, 26 which will drive shaft 27 and operate the chain 30 that drives the grain canvas (not shown). The sickle frame and sickle and reel may be raised or lowered with relation to the ground line by means of the screw 6 to permit the cutting of grain more or less near the ground. When the reel and sickle are not in use they may be raised into inoperative position manually as shown in full lines in Fig. 2. The free end of the reel shaft 36 is first raised out of engagement with the standard 34 and the reel swung, through the medium of the universal joints 37, lengthwise of the frame of the machine as shown in Fig. 2, full lines. The sickle frame 33 is now raised substantially into vertical position and so retained by means of a hook 52 carried by the frame beam 4 being placed in engagement with an eyebolt 53 carried by said sickle frame. The sickle frame 33 in its operative position is supported at its grassward end by the wheel 53ª.

What is claimed is:—

In a harvester, a main frame having a forward cross beam, supporting wheels at the rear of the main frame, an extension frame forward of said cross beam, wheels supporting said extension frame, a drive shaft supported beneath said cross beam, means connected between one of the forward wheels and said drive shaft for rotating the latter when the harvester is put in motion, a driven shaft supported above said cross beam, drive connections between said drive and driven shafts, a side frame hinged to said main frame, a bifurcated bearing on the side frame, a reel, a reel shaft carrying said reel and having one end removably fitting in said bearing, and universal joint connections between said reel shaft and driven shaft to permit the reel to be swung upwardly with the side frame and folded down longitudinally of the main frame.

In testimony that I claim the foregoing as my own I have hereto affixed my signature in the presence of two subscribing witnesses.

JOHN OLSON.

Witnesses:
C. D. WARD,
GEO. A. DAYTON.